(12) United States Patent
Chunduri et al.

(10) Patent No.: US 8,843,737 B2
(45) Date of Patent: Sep. 23, 2014

(54) ENHANCED APPROACH FOR TRANSMISSION CONTROL PROTOCOL AUTHENTICATION OPTION (TCP-AO) WITH KEY MANAGEMENT PROTOCOLS (KMPS)

(75) Inventors: Uma S. Chunduri, Fremont, CA (US); Albert Jining Tian, Cupertino, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 124 days.

(21) Appl. No.: 13/219,548

(22) Filed: Aug. 26, 2011

(65) Prior Publication Data
US 2013/0024684 A1 Jan. 24, 2013

Related U.S. Application Data

(60) Provisional application No. 61/511,102, filed on Jul. 24, 2011.

(51) Int. Cl.
*H04L 29/06* (2006.01)

(52) U.S. Cl.
CPC ............. *H04L 63/166* (2013.01); *H04L 63/08* (2013.01); *H04L 63/061* (2013.01)
USPC ........... 713/151; 713/168; 713/171; 380/277; 380/278; 380/283; 709/227; 709/230

(58) Field of Classification Search
CPC ....... H04L 63/061; H04L 63/06; H04L 63/08; H04L 63/166
USPC .......... 713/151, 168, 171; 380/277, 278, 283; 709/227, 230
See application file for complete search history.

(56) References Cited

U.S. PATENT DOCUMENTS

| 6,246,771 | B1 * | 6/2001 | Stanton et al. ................. 380/286 |
| 7,120,930 | B2 * | 10/2006 | Maufer et al. .................. 726/11 |
| 7,412,600 | B2 * | 8/2008 | Wong et al. .................... 713/160 |
| 8,553,879 | B2 * | 10/2013 | Nomura et al. ................. 380/35 |
| 2002/0126849 | A1 * | 9/2002 | Howard et al. ................. 380/277 |
| 2004/0034773 | A1 * | 2/2004 | Balabine et al. ............... 713/168 |
| 2004/0093522 | A1 * | 5/2004 | Bruestle et al. ............... 713/201 |
| 2004/0193876 | A1 * | 9/2004 | Donley et al. ................. 713/162 |
| 2006/0274899 | A1 * | 12/2006 | Zhu et al. ...................... 380/281 |
| 2007/0022164 | A1 * | 1/2007 | Nog et al. ..................... 709/206 |
| 2007/0160063 | A1 * | 7/2007 | Mynam et al. ........... 370/395.52 |
| 2007/0266236 | A1 * | 11/2007 | Colditz ......................... 713/153 |

(Continued)

OTHER PUBLICATIONS

G. Lebovitz et al., The Threat Analysis and Requirements for Cryptographic Authentication of Routing Protocols' Transports, draft-ietf-karp-threats-reqs-03, KARP Working Group, Internet-Draft, Jun. 18, 2011, 28 pages.

(Continued)

*Primary Examiner* — Christopher Revak
*Assistant Examiner* — Sarah Su
(74) *Attorney, Agent, or Firm* — Blakely Sokoloff Taylor Zafman LLP

(57) ABSTRACT

A network element supports Transmission Control Protocol Authentication Option (TCP-AO) with a Key Management Protocol (KMP) to authenticate TCP segments over a TCP session. The network element negotiates multiple traffic keys to authenticate TCP segments over a TCP session with a peer network element, and protects the TCP session with the negotiated traffic keys.

19 Claims, 4 Drawing Sheets

(56) References Cited

U.S. PATENT DOCUMENTS

| | | | |
|---|---|---|---|
| 2009/0323954 A1* | 12/2009 | Sprunk et al. | 380/259 |
| 2009/0328186 A1* | 12/2009 | Pollutro et al. | 726/13 |
| 2010/0030694 A1* | 2/2010 | Britsch | 705/64 |
| 2010/0205443 A1* | 8/2010 | Zhao et al. | 713/171 |
| 2010/0290624 A1* | 11/2010 | Buer et al. | 380/277 |
| 2010/0299525 A1* | 11/2010 | Shah et al. | 713/171 |
| 2011/0119487 A1* | 5/2011 | Alexander et al. | 713/160 |
| 2011/0317834 A1* | 12/2011 | Chaturvedi et al. | 380/255 |
| 2012/0117248 A1* | 5/2012 | Weis et al. | 709/227 |
| 2013/0054966 A1* | 2/2013 | Clay | 713/168 |
| 2014/0047528 A1* | 2/2014 | Schmidt et al. | 726/7 |
| 2014/0169557 A1* | 6/2014 | Gammel et al. | 380/44 |

OTHER PUBLICATIONS

D. Harkins et al., the Internet Key Exchange (IKE), Network Working Group, Request for Comments: 2409, Nov. 1998, 41 pages.

S. Bellovin et al., Guidelines for Cryptographic Key Management, Network Working Group, Request for Comments: 4107, Jun. 2005, 7 pages.

C. Kaufman, Internet Key Exchange (IKEv2) Protocol, Network Working Group, Request for Comments: 4306, Dec. 2005, 99 pages.

J. Touch et al., the TCP Authentication Option, Internet Engineering Task Force (IETF), Request for Comments: 5925, Jun. 2010, 49 pages.

G. Lebovitz et al., Cryptographic Algorithms for the TCP Authentication Option (TCP-AO), Internet Engineering Task Force (IETF), Request for Comments: 5926, Jun. 2010, 16 pages.

D. Eastlake et al., "Randomness Requirements for Security," Jun. 2005, 48 pages, Network Working Group, Request for Comments: 4086, The Internet Society.

C. Kaufman et al., "Internet Key Exchange Protocol Version 2 (IKEv2)," Sep. 2010, 138 pages, Internet Engineering Task Force (IETF), Request for Comments: 5996, IETF Trust and the persons identified as the document authors.

Alfred Menezes et al., "On Reusing Ephemeral Keys in Diffie-Hellman Key Agreement Protocols," Jan. 2010, 8 pages, International Journal of Applied Cryptography, vol. 2, Issue 2.

D. Kuegler et al., "Password Authenticated Connection Establishment with IKEv2 draft-kuegler-ipsecme-paceikev2-06," Mar. 29, 2011, 18 pages, Network Working Group, Internet-Draft, IETF Trust and the persons identified as the document authors.

Andrew Krywaniuk, "Comment regarding Nonce Size," Dec. 14, 2011, 2 pages, downloaded from http://www.vpnc.org/ietf-ipsec/01.ipsec/msg02496.html.

H. Tschofenig et al., "The Extensible Authentication Protocol-Internet Key Exchange Protocol version 2 (EAP-IKEv2) Method," Feb. 2008, 33 pages, Network Working Group, Request for Comments: 5106, The IETF Trust.

M. Bhatia, "Using short-lived traffic keys for Routing Protocols draft-bhatia-karp-short-lived-keys-00," Apr. 16, 2011, 7 pages, Network Working Group, Internet-Draft, IETF Trust and the persons identified as the document authors.

G. Lebovitz et al., "Keying and Authentication for Routing Protocols (KARP) Design Guidelines draft-ietf-karpdesign-guide-02.txt," Mar. 2011, 26 pages, IETF Trust and the persons identified as the document authors.

Wikipedia, "Perfect forward secrecy,"Apr. 22, 2011, 2 pages, downloaded from http://web.archive.org/web/201104222223033/http://en.wikipedia.org/wiki/Perfect_forward_secrecy.

Jethanandani, et al., "Analysis of BGP, LDP, PCEP, and MSDP Security According to KARP Design Guide", Internet Engineer Task Force (IETF); Internet Society (ISOC); draft-ietf-karp-routing-tcp-analysis-00.txt [retrieved Jun. 21, 2010], Jun. 21, 2010, 16 pages.

* cited by examiner

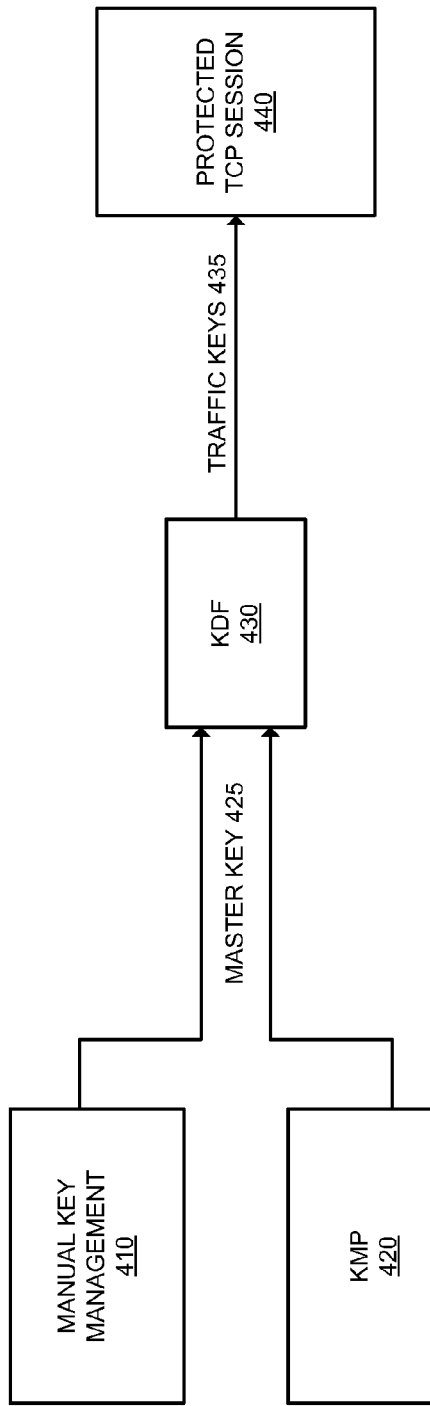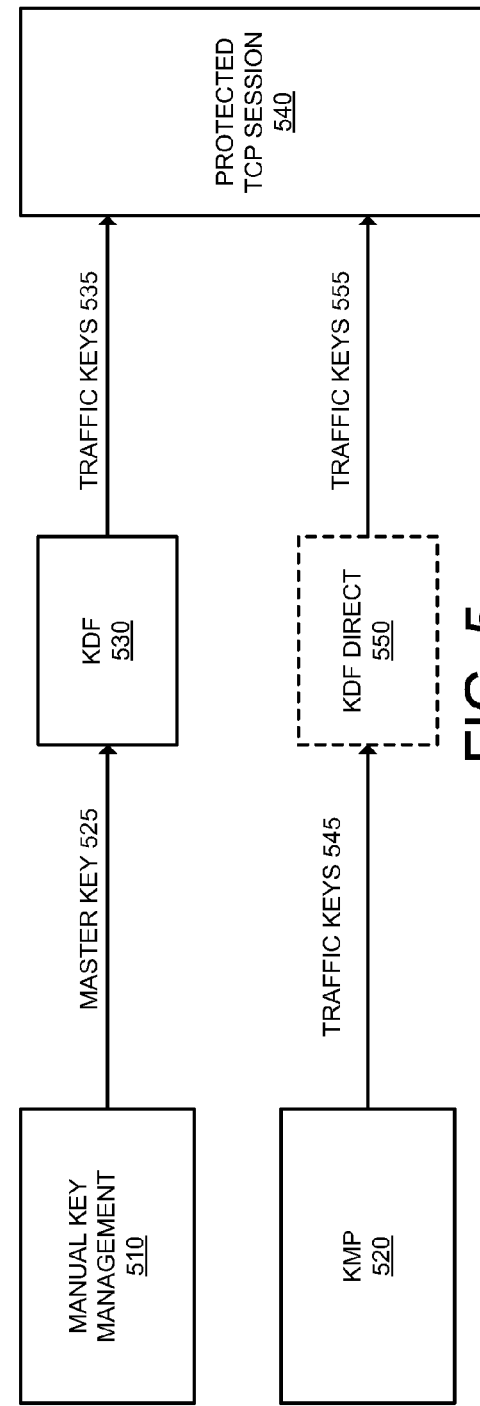

ENHANCED APPROACH FOR TRANSMISSION CONTROL PROTOCOL AUTHENTICATION OPTION (TCP-AO) WITH KEY MANAGEMENT PROTOCOLS (KMPS)

CROSS-REFERENCE TO RELATED APPLICATIONS

This application claims the benefit of U.S. Provisional Application No. 61/511,102, filed Jul. 24, 2011, which is hereby incorporated by reference.

FIELD

Embodiments of the invention relate to the field of networking; and more specifically, to an enhanced approach for TCP-AO with key management protocols.

BACKGROUND

TCP Authentication Option (TCP-AO), described in RFC 5925, June 2010, replaces the conventional TCP MD5 authentication mechanism and is used to authenticate TCP segments for long-lived Border Gateway Protocol (BGP) sessions, Label Distribution Protocol (LDP) sessions, BGP route reflectors, or any other client-server TCP applications. Unlike TCP-MD5, TCP-AO supports the use of stronger hash functions, provides replay protection for long-lived connections and across repeated instances of a single connection, coordinates key changes between endpoints, and provides a more explicit recommendation for external key management to use, which could be either manual or auto key management.

TCP-AO allows re-keying during a TCP connection (assuming that an out of band protocol or manual mechanism provides the new keys). The option includes a key ID that allows the efficient concurrent use of multiple keys. A key coordination mechanism using a "receive next key ID" manages the key change within a connection.

TCP-AO supports key changes with zero segment loss. TCP-MD5 can lose segments in transit during the changeover or require trying multiple keys on each received segment during key use overlap because it lacks an explicit key ID. Although TCP recovers lost segments through retransmission, loss can have a substantial impact on performance.

TCP-AO provides automatic replay protection for long-lived connections using sequence number extensions.

TCP-AO includes TCP's socket pair (source address, destination address, source port, destination port) as a security parameter index (together with the Key ID), rather than using a separate field as an index (e.g., IPsec's Security Parameter Index (SPI)).

TCP-AO ensures per-connection traffic keys as unique as the TCP connection itself, using TCP's Initial Sequence Numbers (ISNs) for differentiation.

TCP-AO defines a Master Key Tuple (MKT), which is used to derive unique traffic keys and includes the keying material used to generate those traffic keys (such as the master key), as well as indicates the associated parameters under which traffic keys are used. Such parameters include whether TCP options are authenticated and indicators of the algorithms used for traffic key derivation and Message Authentication Code (MAC) calculation. Each MKT contains the following as described in RFC 5925:

- TCP connection identifier. For example, a TCP socket pair (local IP address, remote IP address, TCP local port, and TCP remote port). Values can be partially specified using ranges (e.g., 2-30), masks (e.g., 0xF0), wildcards (e.g., *) or other suitable indication.
- TCP option flag. This flag indicates whether TCP options other than TCP-AO are included in the MAC calculation. When options are included, the content of all options, in the order present, is included in the MAC with TCP-AO's MAC field zeroed out. When the options are not included, all options other than TCP-AO are excluded from all MAC calculations (skipped over).
- IDs (KeyID, RNextKeyID) SendID, ReceiveID. The values used in the KeyID or RNextKeyID of TCP-AO, which are used to differentiate MKTs in concurrent use (KeyID), as well as to indicate when MKTs are ready for use in the opposite direction (RNextKeyID). Each MKT has two IDs, a SendID and ReceiveID. The SendID is inserted as the KeyID of the TCP-AO option of outgoing segments, and the ReceiveID is matched against the TCP-AO KeyID of incoming segments.
- Master key. A byte sequence used for generating traffic keys, which may be derived from a separate shared key by an external protocol over a separate channel.
- Key Derivation Function (KDF). Indicates the key derivation function and its parameters that are used to generate traffic keys from master keys.
- Message Authentication Code (MAC) Algorithm. Indicates the MAC algorithm and its parameters as used for this connection.

In TCP-AO, a traffic key is a key derived from the MKT, the local and remote IP address pairs and TCP port numbers, and the TCP Initial Sequence Numbers (ISNs) in each direction. A single MKT can be used to derive a Send_SYN_traffic_key (used to authenticate outgoing SYNs), a Receive_SYN_traffic_key (used to authenticate incoming SYNs), a Send_other_traffic_key (used to authenticate all other outgoing TCP segments), and/or a Receive_other_traffic_key (used to authenticate all other incoming TCP segments).

The Key Derivation Function (KDF) defined in RFC 5925 has the following interface:

traffic_key=KDF_alg(master_key, context, output_length), where:

- the KDF_alg is the specific KDF that is used to construct the traffic key as indicated in the MKT;
- the master_key is the master key stored into the associated MKT;
- the context is used as input in constructing the traffic key (e.g., S-IP, S-Port, S-ISN, D-IP, D-Port, and D-ISN);
- the output length is the desired output length of the KDF; and
- the traffic_key is the desired output of the KDF, of length equal to the output length, which is to be used as input to the MAC algorithm to protect the TCP segments The following table indicates how each of the traffic keys are computed, where the TCP-AO algorithms refer to source (S) and destination (D) values of the IP address, TCP port, and ISN, and each segment (incoming or outgoing) has a value that refers to the local side of the connection (l) and a remote side (r):

|   | S-IP | S-Port | S-ISN | D-IP | D-Port | D-ISN |
|---|------|--------|-------|------|--------|-------|
| Send_SYN_traffic_key | l-IP | l-port | l-ISN | r-IP | r-port | 0 |
| Receive_SYN_traffic_key | r-IP | r-port | r-ISN | l-IP | l-port | 0 |
| Send_other_traffic_key | l-IP | l-port | l-ISN | r-IP | r-port | r-ISN |
| Receive_other_traffic_key | r-IP | r-port | r-ISN | l-IP | l-port | l-ISN |

Thus, four different keys are derived based on parameters as provisioned in the MKT and using the out of band provisioned master key.

TCP-AO is commonly deployed with manually provisioned keys at both peers who are interested in integrity protection of the session. As described in IETF draft "The Threat Analysis and Requirements for Cryptographic Authentication of Routing Protocols' Transports", draft-ietf-karp-threats-reqs-03, Jun. 18, 2011, there is an issue with master key compromise because of a terminated/turned employee or out-of-band master key access. In the TCP-AO manual method described in RFC 5925, although unique traffic keys are generated with the master key and other session specific parameters through the Key Derivation Function (KDF), the unique traffic keys cannot protect the session when master key itself is compromised. This is not a problem that is isolated to TCP-AO as it is also a problem for any manual key management protocol.

SUMMARY

Transmission Control Protocol Authentication Option (TCP-AO) with a Key Management Protocol (KMP) to authenticate TCP segments of a TCP session is described. In one embodiment, a network element negotiates, with a peer network element, a plurality of traffic keys used to authenticate TCP segments over the TCP session with that peer network element. The network element then protects the TCP session with the negotiated traffic keys. In one embodiment, the negotiated traffic keys are unique to that TCP session.

In one embodiment, a network element includes an application that is configured to request authentication of outgoing and incoming TCP segments from a TCP-AO module. The TCP-AO module is configured to trigger a KMP module to negotiate a plurality of traffic keys with a peer network element and populate the negotiated traffic keys into a data structure used by the TCP-AO module to authenticate the outgoing and incoming TCP segments.

In one embodiment, KMPs derive traffic keys with the keying material (e.g., NONCEs) exchanged (through KMP message exchanges) on the private (e.g., encrypted) and secure (e.g., integrity protected) channel already established between the peers by the KMP. The initially authenticated shared master key may or may not be part of the traffic key calculation by KMP based on the provisioning and/or requirements of the service (e.g., a new Diffie-Helman shared secret may be used instead of an initial Diffie-Helman shared secret). In embodiments where the negotiated traffic keys are unique per session, a compromised set of traffic keys only affects a single session; whereas a compromised master key may potentially affect multiple sessions. In addition, TCP-AO with KMPs that directly negotiate traffic keys allows for a more granular negotiation of session specific parameters as not all sessions are tied to the same MKT. Thus, by way of example, different MAC algorithms may be used for different sessions.

BRIEF DESCRIPTION OF THE DRAWINGS

The invention may best be understood by referring to the following description and accompanying drawings that are used to illustrate embodiments of the invention. In the drawings:

FIG. 4 generally illustrates traffic key generation in TCP-AO derived from a master key; and FIG. 5 generally illustrates traffic key generation in TCP-AO where KMPs are used to directly negotiate traffic keys according to one embodiment.

DESCRIPTION OF EMBODIMENTS

Figure 1:
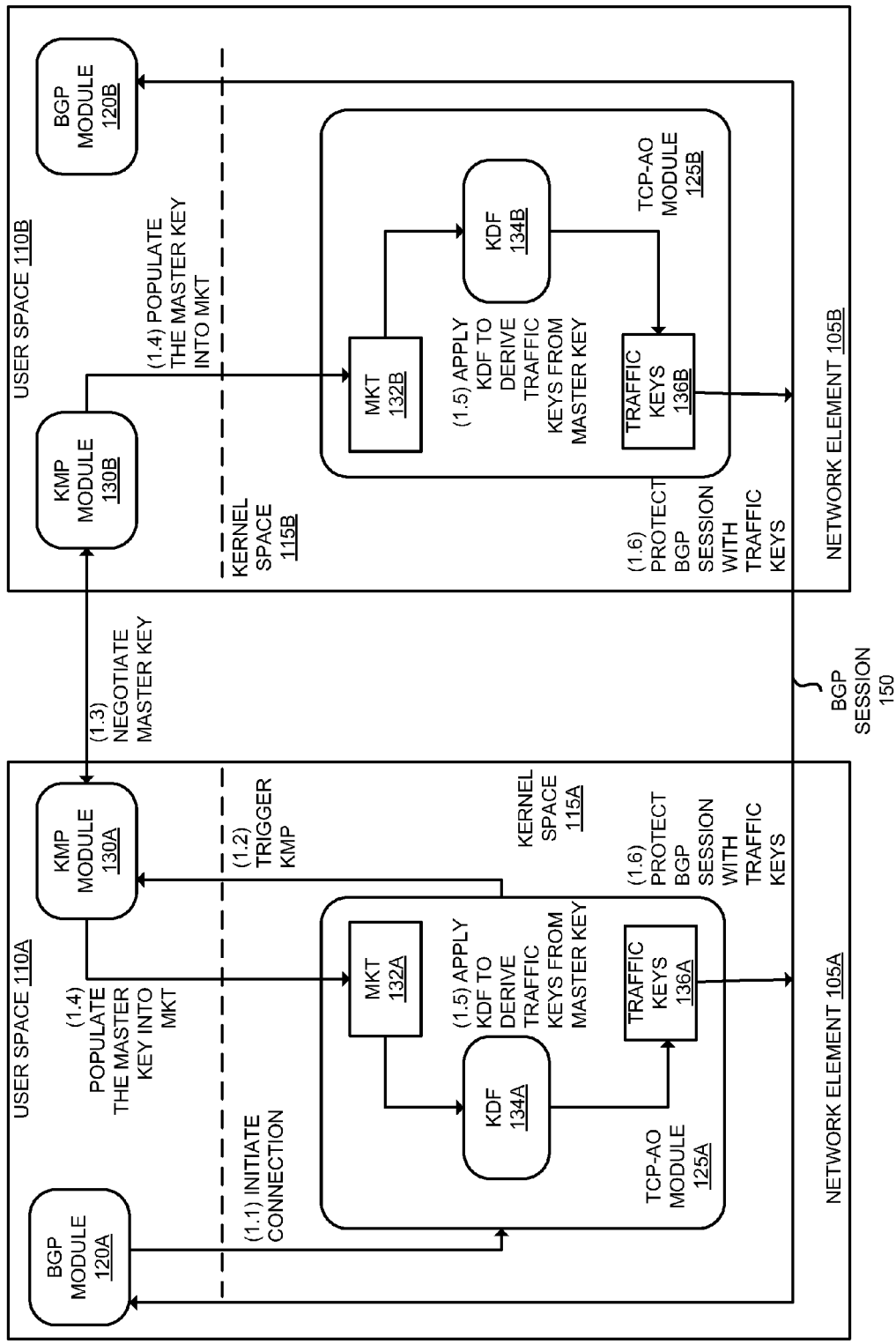
FIG. 1 is a data flow diagram that illustrates a TCP-AO mechanism with KMP to protect a TCP session between two peers where a shared master key is negotiated between the peers and the traffic keys are derived from that master key.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

A method and apparatus for an enhanced approach for TCP-AO with KMP is described. In one embodiment of the invention, when using TCP-AO with KMPs, traffic keys are generated and populated in MKTs by the KMPs and re-used directly to protect TCP sessions without the need of additional KDF (e.g., KMPs such as Internet Key Exchange (IKE) (described in RFC 2409, The Internet Key Exchange (IKE), November 1998), IKEv2 (described in RFC 4306, Internet Key Exchange (IKEv2) Protocol, December 2005)). Instead of a shared master key, MKTs include KMP negotiated traffic keys on the already established secure channel with the peer provided by the KMP. This approach is inherently immune to replay attacks as new cryptoquality NONCEs are used every time new traffic key pair is negotiated.

In one embodiment, the MKTs that include traffic keys are established by KMPs. For example, if TCP-AO does not find a matching MKT for the first TCP segment (SYN) during TCP connection establishment, the KMPs are triggered to negotiate traffic keys, with all required and optional parameters (e.g., extra Diffie-Helman key exchange if required or desired). Depending on the selected KMP, the KMP establishes a secure channel and negotiates both an authenticated shared master key (and the secure channel) as well as the traffic keys, or negotiates an authenticated shared master key (and the secure channel) followed by negotiating the traffic keys in two separate steps. Regardless, the KMPs provide the information to TCP-AO to create a new MKT with traffic keys as well as all negotiated parameters.

In one embodiment, if a new second session is to be established between the same peers or when an existing session is to be restarted, and/or when an existing session is to be re-keyed, then responsive to the new trigger, the KMP performs the requested action on the already established secure channel. KMP provides all the information to TCP-AO to create new MKT with traffic keys as well as all negotiated parameters for a given request.

TCP-AO with KMP that Negotiates Master Key and Derives Traffic Keys from that Master Key Instead of using manual key management, TCP-AO may be used with a Key Management Protocol (KMP). RFC 4107, Guidelines for Cryptographic Key Management, June 2005, generally describes the advantages of KMPs (also referred to as Automatic Key Management (AKM)) and disadvantages of manual key management. As described in RFC 4107, key management refers to the establishment of cryptographic keying material for use with a cryptographic algorithm to provide protocol security services (e.g., integrity, authentication, and confidentiality). AKM generally derives one or more short-term session keys using a KDF that makes use of long-term keys.

RFC 5926, Cryptographic Algorithms for the TCP Authentication Option (TCP-AO), June 2010, suggests that KMPs such as IKEv2 are to be deployed when auto re-keying is required. Even with using KMP as suggested by RFC 5926, one of the main components of the MKT is the shared master key, which is mutually authenticated and securely exchanged with the peer. The traffic key generation of TCP-AO with KMP is similar as the traffic key generation with manual key management with the exception that some of the parameters (e.g., the master key, and KDFs) are populated in both ends by the KMP. The KDF has the following interface: traffic_key=KDF_alg(master_key, context, output_length), where the master_key is the master shared key between the two pairs generated by KMP, and the KDF algorithm is used to generate traffic keys as specified, for example, in section 3.1 of RFC 5926.

In TCP-AO with KMP that negotiates a master key, the traffic key parameters (e.g., source/destination IP address, ports, and ISNs) are exchanged in plain text (not encrypted). If the master key is compromised, then all traffic keys derived from the master key will be compromised. Traffic key derivation from the master key is used in the following scenarios in TCP-AO: the first TCP session between the peers; multiple TCP sessions between the same peers; existing session restart between the same peers; and session re-key for long lived sessions.

FIG. 1 is a data flow diagram that illustrates a TCP-AO mechanism with KMP to protect a TCP session between two peers where a shared master key is negotiated between the peers and the traffic keys are derived from that master key. The network elements 105A-B are peers in a TCP session that use TCP-AO with KMP to protect the TCP session. The network elements 105A-B are logically separated into the user space 110A-B respectively and the kernel space 115A-B respectively. The BGP modules 120A-B and the KMP modules 130A-B are part of the user space 110A-B respectively, and the TCP-AO modules 125A-B are part of the kernel space 115A-B respectively. As illustrated in FIG. 1 the network elements 105A-B are network elements participating in a BGP session; however similar operations can be performed for network elements participating in LDP sessions, BGP route reflectors, or any other client-server TCP applications.

At an operation 1.1, the BGP module 120A of the network element 105A initiates a TCP connection which triggers the TCP-AO module 125A to begin a process to protect the TCP connection using the TCP-AO option. Part of the TCP connection may be configured (e.g., source/destination IP addresses, source/destination ports, etc.).

At an operation 1.2, the TCP-AO module 125A triggers the KMP module 130A to obtain a master key for the session. By way of example, the TCP-AO module 125A may provide the peer IP address, an extra Diffie-Helman key exchanged required for the traffic key exchange (in environments where PFS is desired or required), MAC algorithm(s) supported and/or provisioned locally by the TCP-AO module 125A, lifetime of the traffic keys provisioned locally by the TCP-AO module 125A, and/or other input selectors for session identification for KMP (e.g., S-IP, S-Port, D-Port, and optionally the application protocol being protected (e.g., BGP, LDP, etc.)) to trigger the KMP module 130A to negotiate the master key for the session.

The KMP module 130A may be any suitable KMP. For example, the KMP module 130A may implement Secure Sockets Layer (SSL), Transport Layer Security (TLS), Internet Key Exchange (IKE), IKEv2, or any other suitable protocol for negotiating one or more keys between network elements and their distribution with limited involvement of the operator. Also, the KMP typically has the ability to automatically re-key (e.g., automatically re-negotiate the key responsive to the lifetime of the key expiring).

At operation 1.3, the KMP modules 130A-B negotiate a master key. The KMP modules 130A-B may also negotiate other session specific parameters (e.g., an indication of the MAC algorithm to be used, an indication of the KDF to be used, the lifetime, etc.). Prior to negotiating the master key (and other session specific parameters), the KMP modules 130A-B typically authenticate their peer and create a secure encrypted channel. After the secure encrypted channel is established, the KMP modules 130A-B negotiate the master key and the session specific parameters.

At operation 1.4, the KMP modules 130A-B populate the master key into the MKT 132A-B respectively (the KMP modules 130A-B may also populate other negotiated session specific parameters such as the MAC algorithm indication and the KDF indication). The MKT 132A-B include the following fields: a TCP connection identifier, a TCP option flag, IDs, master key, KDF; and MAC algorithm.

At operation 1.5, the TCP-AO modules 125A-B apply the KDF 134A-B indicated in the MKT 132A-B to derive the traffic keys from the master key. In one embodiment, each of the KDF 134A-B has the following interface:

traffic_key=KDF_alg(master_key, context, output_length), where:
the KDF_alg is the specific KDF that is used to construct the traffic key as indicated in the MKT;
the master_key is the master key stored into the associated MKT;
the context is used as input in constructing the traffic key (e.g., S-IP, S-Port, S-ISN, D-IP, D-Port, and D-ISN);
the output length is the desired output length of the KDF; and the traffic_key is the desired output of the KDF, of length equal to the output length, which is to be used as input to the MAC algorithm to protect the TCP segments The following table indicates how each of the traffic keys are computed, where the TCP-AO algorithms refer to source (S) and destination (D) values of the IP address, TCP port, and ISN, and each segment (incoming or outgoing) has a value that refers to the local side of the connection (l) and a remote side (r):

|  | S-IP | S-Port | S-ISN | D-IP | D-Port | D-ISN |
| --- | --- | --- | --- | --- | --- | --- |
| Send_SYN_traffic_key | l-IP | l-port | l-ISN | r-IP | r-port | 0 |
| Receive_SYN_traffic_key | r-IP | r-port | r-ISN | l-IP | l-port | 0 |
| Send_other_traffic_key | l-IP | l-port | l-ISN | r-IP | r-port | r-ISN |
| Receive_other_traffic_key | r-IP | r-port | r-ISN | l-IP | l-port | l-ISN |

At operation 1.6, the TCP-AO module 125A-B uses one or more of the traffic keys 136A-B respectively to protect the BGP session 150. For example, the traffic keys are used in the MAC calculation to protect the TCP segments of the BGP session 150.

In the case of multiple TCP sessions between the same peers, section 5.3.1 of RFC 5925 specifies master key re-use if multiple sessions need to be established between the same peers. With usage of KDFs and different socket parameters and different ISNs, unique traffic keys can be derived. This is mainly to secure from inter session replay attacks per TCP AO. However, all these traffic keys will be compromised if the master key is compromised. Thus, when the master key is compromised, even though different traffic keys are used for different TCP sessions between the same peers, all these sessions are no longer protected. If the traffic keys need to be generated in-band as suggested by RFC 5925, care should be taken to ensure that the random numbers used for these traffic key derivations are exchanged on the secured channel which is used to derive the master key with KMP and they must be at least half the key size of the used KDF.

In the case of existing session restart between the same peers, section 5.3.1 of RFC 5925 specifies master key re-use if the existing session has to be restarted and re-established between the same peers. With usage of KDFs and different ISNs, RFC 5925 describes that unique traffic keys can be derived and is secure from inter-session replay attacks. However, these traffic keys will be compromised if the master key is compromised. When the master key is compromised, re-use of the master key to derive new traffic keys with openly exchanged parameters does not protect the new session since all session parameters and new ISN set is known to attacker and KDFs cannot help in this situation.

In the case of session re-key for long lived sessions, sections 5.3.2 and 6 of RFC 5925 specifies a mechanism to re-key for existing long lived sessions through a "new MKT", which essentially is a new master key and then using KDFs to derive new traffic keys for the same existing session. This is the most common case in some applications, where periodic re-key happens for the existing sessions. However, to generate new traffic keys, it is not required to get a new master key. The master key between two peers is generated initially by doing mutual authentication. The derived traffic keys are generated by Auto Key Management (AKM)/KMPs to avoid full master key derivation again. However, with the way that TCP-AO describes re-keying traffic keys, every time session re-key occurs a new master key is required, which implies re-authentication between same endpoints as opposed to a simple re-key of the master key. Consider a case if TCP-AO is used to protect BGP router/BGP route reflector or any other TCP client server application with lot of different connections (either with different end points or multiple connections with same end points) and session re-key has to happen. If the same pair of endpoints requires different master keys for each connection and also for each re-established connection, then the same endpoints need to perform complete mutual authentication to get a new master key for each connection. Complete mutual authentication to derive new common master keys for the MKT is computationally expensive as it requires not only a significant amount of messaging but also processor intensive cryptographic operations (in some cases public key operations if KMP uses certificates) for mutual authentication/peer identity verification. This is an unintended consequence and not required if KMPs re-key capability is used effectively. Re-keying doesn't involve peer identity verification and also light weight in comparison to full-authentication.

Thus, in summary, TCP-AO with KMP where the generation of the traffic keys is based on a shared master key either cannot protect the underlying TCP session if the master key is compromised or requires an inefficient way of generating new traffic keys for session re-key for long lived sessions.

TCP-AO with KMP that Directly Negotiate Traffic Keys

In one embodiment, instead of negotiating a shared master key and using a KDF to derive the traffic keys from the master key, traffic keys are generated and populated directly in the MKTs by the KMPs and used to protect the TCP sessions without the need of an extensive KDF algorithm. Thus, instead of a shared master key, the MKTs include KMP negotiated traffic keys on the already established secure channel with the peer.

Since the KMPs generate the traffic keys, the out-of-band master key compromise issue is eliminated. At worst, since the traffic keys are typically unique per session, a compromised set of traffic keys only affects that session, whereas a compromised master key may potentially affect multiple sessions. In addition, TCP-AO also benefits from more efficient use of re-keying support provided by most KMPs. For example, if an existing protected session key has to be changed, it can be done without the expensive negotiation of a new master key through full authentication. In addition, TCP-AO with KMP that directly negotiate traffic keys is inherently immune to replay attacks as a new NONCE is used each time a new traffic key pair is negotiated.

Figure 2:
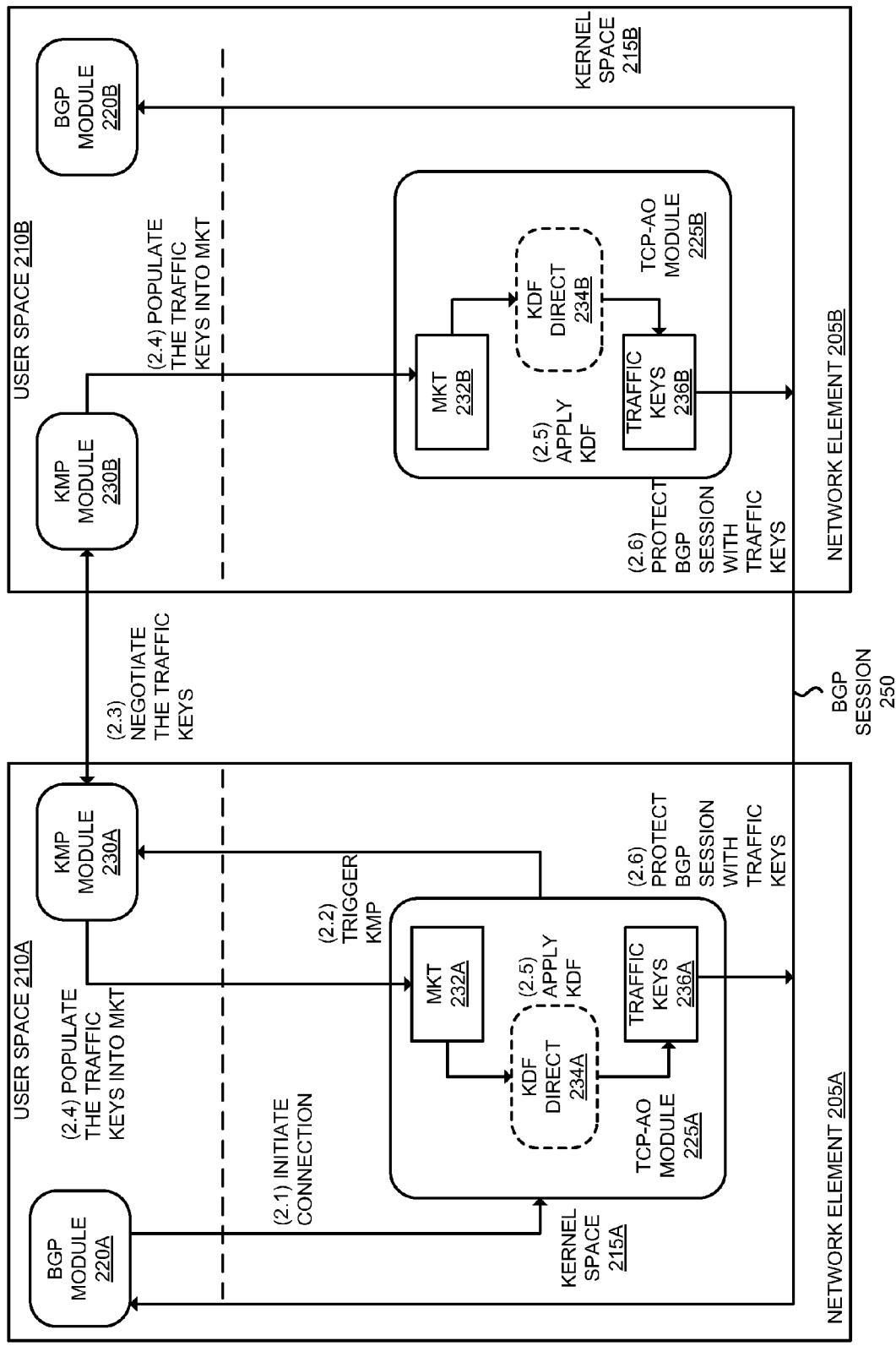
FIG. 2 is a data flow diagram that illustrates a TCP-AO mechanism with KMPs to directly negotiate traffic keys to protect a TCP session between two peers according to one embodiment.

FIG. 2 is a data flow diagram that illustrates a TCP-AO mechanism with KMPs to directly negotiate traffic keys to protect a TCP session between two peers according to one embodiment. The network elements 205A-B are peers in a TCP session that use TCP-AO with KMPs that directly negotiate traffic keys to protect the TCP session. The network elements 205A-B are logically separated into the user space 210A-B respectively and the kernel space 215A-B respectively. The BGP modules 220A-B and the KMP modules 230A-B are part of the user space 210A-B respectively, and the TCP-AO modules 225A-B are part of the kernel space 215A-B respectively. As illustrated in FIG. 2 the network elements 205A-B are network elements participating in a BGP session; however similar operations can be performed for network elements participating in LDP sessions, BGP route reflectors, or any other client-server TCP applications.

At an operation 2.1, the BGP module 220A of the network element 205A initiates a TCP connection to the network element 205B which triggers the TCP-AO module 225A to begin a process to protect the TCP connection using the TCP-AO option. Part of the TCP connection may be configured (e.g., source/destination IP addresses, source/destination ports, etc.).

At an operation 2.2, the TCP-AO module 225A triggers the KMP module 230A to negotiate traffic keys for the session. By way of example, the TCP-AO module 225A may provide the peer IP address, an extra Diffie-Helman key exchanged required for the traffic key exchange (in environments where PFS is desired or required), MAC algorithm(s) supported and/or provisioned locally by the TCP-AO module 225A, lifetime of the negotiated traffic keys of the TCP session provisioned locally by the TCP-AO module 225A, and/or other input selectors for session identification for KMP (e.g., S-IP, S-Port, D-Port, and optionally the application protocol being protected (e.g., BGP, LDP, etc.)) to trigger the KMP module 230A to negotiate the traffic keys for the session.

The KMP module 230A may be any suitable KMP. For example, the KMP module 230A may implement SSL, TLS, IKE, IKEv2, or any other suitable protocol for negotiating one or more keys between network elements and their distribution with limited involvement of the operator. Also, the KMP typically has the ability to automatically re-key (e.g., automatically re-negotiate the key responsive to the lifetime of the key expiring).

At operation 2.3, the KMP modules 230A-B directly negotiate the traffic keys to protect the session. In one embodiment, the traffic keys are unique to the session as a result of each peer using a random NONCE. The KMP modules 230A-B may also negotiate other session specific parameters (e.g., an indication of the MAC algorithm to be used, the lifetime of the key, etc.). Prior to negotiating the traffic key (and other session specific parameters), the KMP modules 230A-B typically authenticate their peer and create a secure encrypted channel. After the secure encrypted channel is established, the KMP modules 230A-B directly negotiate the traffic keys and the session specific parameters. In one embodiment, the KMP modules 230A-B do not negotiate a master key.

At operation 2.4, the KMP modules 230A-B populate the negotiated traffic keys into the MKTs 232A-B respectively (the KMP modules 230A-B may also populate other negotiated session specific parameters such as the MAC algorithm indication and the KDF indication).

The MKTs 232A-B include the following fields: a TCP connection identifier, a TCP option flag, IDs, KMP send key, KMP receive key, KDF Direct, and MAC algorithm. The KMP send key field and the KMP receive key are populated with the KMP negotiated traffic keys. In one embodiment, the MKTs 232A-B do not include a master key field, while in other embodiments it include the master key field with a value set to null or other value that will be ignored.

The KMP send key field contains the key used to authenticate outgoing TCP segments (e.g., outgoing SYNs and other outgoing TCP segments). The KMP receive key field contains the key used to authenticate incoming TCP segments (e.g., incoming SYNs and other incoming TCP segments).

The KDF Direct field, which is optional, indicates a KDF direct function to be used. The KDF direct essentially copies the negotiated traffic keys into the particular keys defined in the RFC 5925. Thus, the traffic keys defined in RFC 5925 are derived as follows:

Send_SYN_traffic key=KMP send key
Send_other_traffic_key=KMP send key
Receive_SYN_traffic_key=KMP receive key
Receive_other_traffic_key=KMP receive key At operation 2.5, the KDF direct modules 234A-B respectively apply the KDF direct function to derive the traffic keys as defined in RFC 5925 as described above. The traffic keys are stored in the traffic keys 236A-B respectively.

At operation 2.6, the TCP-AO modules 225A-B use one or more of the traffic keys 136A-B respectively to protect the BGP session 250. For example, the traffic keys are used in the MAC calculation to protect the TCP segments of the BGP session 250.

In the case of multiple TCP sessions between the same peers (e.g., network elements 205A-B), for each subsequent session, the generation of the traffic keys is triggered by the TCP-AO module.

In the case of existing session restart between the same peers (e.g., network elements 205A-B), new unique traffic keys are generated and negotiated without re-generating the master key. Uniqueness of the traffic keys is achieved through use of securely exchanged random NONCE between the peers by KMP.

In the case of session re-key for long lived sessions, unique traffic keys are generated and distributed without the need for the computationally expensive master key generation process.

Thus, TCP-AO with KMPs that directly negotiate traffic keys is more efficient than negotiating a master key to derive the traffic keys. Inter/Intra session replay attacks are prevented using TCP-AO with KMPs that directly negotiate traffic keys as traffic key uniqueness is preserved with use of a random NONCE.

Thus, TCP-AO with KMPs that directly negotiate traffic keys without storing or using a KMP generated master key provides for integrity protection and encryption of the KMP message exchanges (on the secure and private channel established by KMP between the peers) while not exposing a mutually authenticated shared master key.

A potential issue may occur in TCP-AO with KMPs that negotiate a master key and multiple traffic keys for multiple sessions are derived from that same MKT/master key due to the randomness surrounding KDF inputs which is based on the randomness of the ISNs, which may be more susceptible to brute force attacks. However, using TCP-AO with KMPs that negotiate traffic keys directly can be uniformly random without being limited by the randomness of the ISNs. For example, NONCEs that meet the requirements of KMP on the length of the random numbers and the cryptographic quality of the random numbers allow for a more uniform unique traffic keys that are more robust to brute force attacks.

If a MKT/master key is being used to derive multiple traffic keys for multiple sessions, parameter negotiation that is specific to a particular session is not possible. For example, the same MAC algorithm is used for each session whose traffic keys is derived from the same MKT/master key. However, using TCP-AO with KMPs that negotiate traffic keys directly allow for a more granular negotiation of session specific parameters as not all sessions are tied to the same MKT/master key. Thus, by way of example, different MAC algorithms may be used for different sessions.

Figure 3:
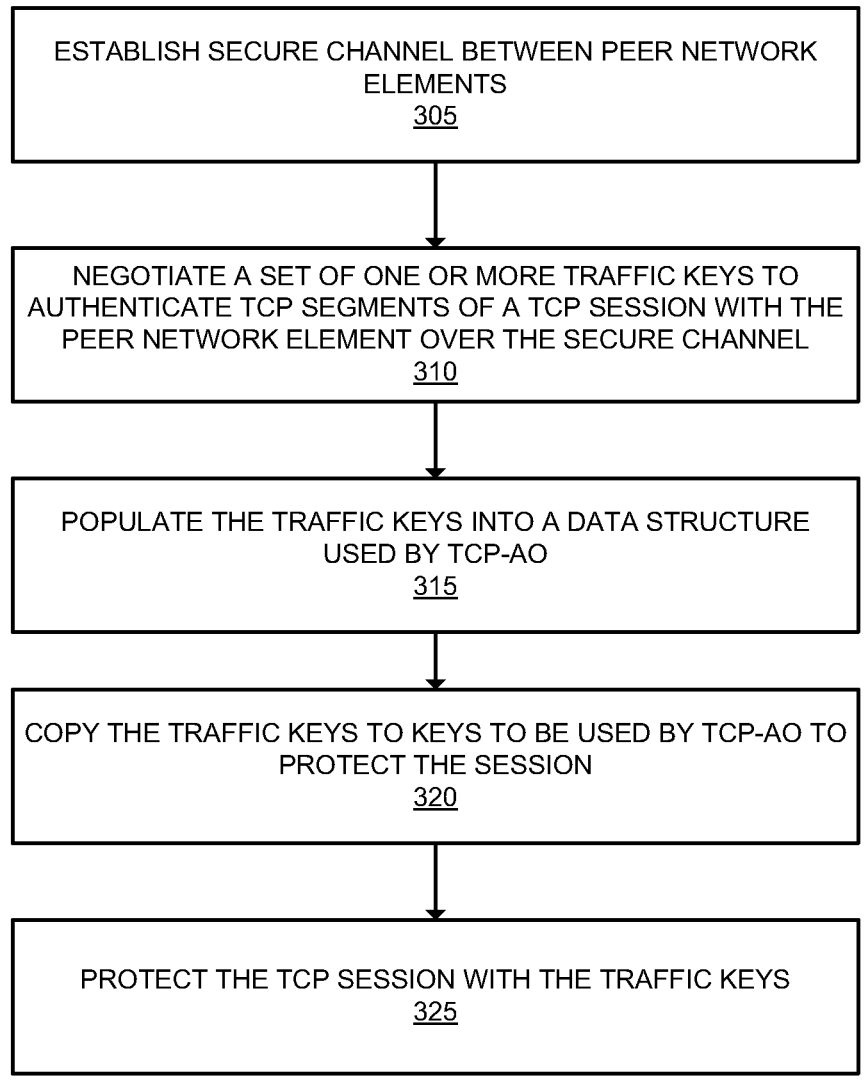
FIG. 3 is a flow diagram that illustrates exemplary operations for protecting a TCP session with TCP-AO using KMPs that directly negotiate traffic keys according to one embodiment.

FIG. 3 is a flow diagram that illustrates exemplary operations for protecting a TCP session with TCP-AO using KMPs that directly negotiate traffic keys according to one embodiment. At operation 305, a KMP on a network element establishes a secure channel with another KMP on a peer network element. Establishing the secure channel may include authenticating the peer network element. The specific way for establishing the secure channel may depend on the type of KMP used (e.g., SSL, TLS, IKE, IKEv2, etc.).

Flow then moves to operation 310 where the KMPs of the peer network elements negotiate, over the secure channel, a set of one or more traffic keys to authenticate the TCP segments of a TCP session. In one embodiment, the set of traffic keys include a KMP send key (used when authenticating outgoing TCP segments) and a KMP receive key (used when authenticating incoming TCP segments). Other session specific parameters may also be negotiated (e.g., which MAC algorithm is to be used, the lifetime, etc.). In one embodiment, as part of the negotiation, the KMPs use cryptographically random NONCEs when negotiating the traffic keys.

Flow then moves to operation 315 and the KMP populates the traffic key(s) into a data structure used by the TCP-AO module (e.g., the MKT structure). Other session specific parameters that the KMP negotiates may also be included in the data structure.

Next, at operation 320, the TCP-AO module copies the traffic keys to keys to be used by the TCP-AO module to protect the session. For example, the TCP-AO module uses a KDF direct function that copies the KMP send key to a Send_SYN_traffic key and Send_other_traffic key, and copies the KMP receive key to a Receive_SYN_traffic_key and Receive_other_traffic_key. Next, at operation 325 the TCP-AO module protects the TCP session with the traffic keys.

FIGS. 4 and 5 generally illustrate the difference between TCP-AO that derive traffic keys from a master key and TCP-AO with KMPs that directly negotiate traffic keys. FIG. 4 generally illustrates traffic key generation in TCP-AO derived from a master key. The manual key management 410 and the KMP 420 represent two ways of generating the master key 425. In either case, the master key 425 is input into the KDF 430. The KDF 430 derives the traffic keys 435 from the master key 425 which are used to protect the TCP session 440.

FIG. 5 generally illustrates traffic key generation in TCP-AO where KMPs are used to directly negotiate traffic keys according to one embodiment. The manual key management 510 still allows for a master key 525 to be manually established between the peers. The KDF 530 derives the traffic keys 535 from the master key 525 which are used to protect the TCP session 540. The KMP 520 directly negotiates the traffic keys 545 with a KMP on the TCP peer. The KDF direct function 550 may be used to copy the traffic keys into the appropriate traffic keys 555 as defined by RFC 5925, which are used to protect the TCP session 540.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory computer-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge) is a piece of networking equipment, including hardware and software, that communicatively interconnects other equipment on the network (e.g., other network elements, end stations). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network elements, which are coupled (e.g., through one or more core network elements) to other edge network elements, which are coupled to other end stations (e.g., server end stations).

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a network element for supporting Transmission Control Protocol Authentication Option (TCP-AO) with a Key Management Protocol (KMP) to authenticate TCP segments over a TCP session, the method comprising:
   in response to a request to create a first TCP session with a peer network element, determining whether a first Master Key Tuple (MKT) associated with the first TCP session has been previously created;
   in response to determining the first MKT has not been previously created, creating the first MKT that includes a send key field, a receive key field, and a Key Derivation Function (KDF) field;
   negotiating, over a first secure encrypted channel, a first plurality of traffic keys including a send key used for authenticating outgoing TCP segments transmitted to the peer network element over the first TCP session and a receive key for authenticating incoming TCP segments received from the peer network element over the first TCP session;
   populating the send key field and the receive key field of the first MKT with the negotiated send key and receive key, respectively, and the KDF field of the first MKT with a value indicating a KDF direct function is to be used, wherein the KDF direct function causes the send key populated in the send key field of the first MKT to be set as a send_SYN_traffic key and send_other_traffic_key and the receive key populated in the receive key field of the first MKT to be set as a receive_SYN_traffic_key and receive_other_traffic_key, instead of negotiating a shared master key and using a KDF to derive the send_SYN_traffic_key, send_other_traffic_key, receive_SYN_traffic_key, and receive_other_traffic_key from the master key; and
   protecting the first TCP session with the TCP-AO by using the send_SYN_traffic_key, send_other_traffic_key, receive_SYN_traffic_key, and receive_other_traffic_key, whereby the first TCP session is protected by the TCP-AO by directly using negotiated traffic keys, instead of using traffic keys derived from a negotiated master key.

2. The method of claim 1, further comprising:
   negotiating a lifetime of the first negotiated traffic keys.

3. The method of claim 2, further comprising:
   negotiating, over a second secure encrypted channel, a second plurality of traffic keys to authenticate TCP segments over a second TCP session with the peer network element; and
   negotiating a lifetime of the second negotiated traffic keys, wherein the lifetime of the first negotiated traffic keys is different than the lifetime of the second negotiated traffic keys.

4. The method of claim 1, further comprising:
   negotiating an indication of a first Message Authentication Code (MAC) algorithm to use when protecting the first TCP session.

5. The method of claim 4, further comprising:
   negotiating a second plurality of traffic keys to authenticate TCP segments over a second TCP session with the peer network element;
   negotiating an indication of a second MAC algorithm to use when protecting the second TCP session, wherein the first MAC algorithm and second MAC algorithm are different; and
   protecting the second TCP session with the negotiated second plurality of traffic keys.

6. The method of claim 5, wherein the first negotiated traffic keys are unique to the first TCP session and the second negotiated traffic keys are unique to the second TCP session.

7. A network element for supporting Transmission Control Protocol Authentication Option (TCP-AO) with a Key Management Protocol (KMP) to authenticate TCP segments over TCP sessions, comprising:
   a set of one or more processors;
   a non-transitory computer-readable medium that stores instructions for a computer program that supports TCP-AO with a KMP to authenticate TCP segments over TCP sessions, the computer program including:
      an application configured to transmit and receive traffic over a set of one or more TCP sessions and request authentication of outgoing and incoming TCP segments for the set of TCP sessions;
      a TCP-AO module operative to:
         for each of the set of one or more TCP sessions, determine whether a Master Key Tuple (MKT) associated with that TCP session has been previously created, and
         for each MKT that has not been previously created, create a MKT for that TCP session, each MKT including a send key field, a receive key field, and a Key Derivation Function (KDF) field;
      a KMP module operative to, for each of the set of TCP sessions, perform the following:
         negotiate, over a first secure encrypted channel, a plurality of traffic keys including a send key used for authenticating outgoing TCP segments for that TCP session and a receive key for authenticating incoming TCP segments for that TCP session,
         populate the send key field and the receive key field of the MKT for that TCP session with the negotiated send key and receive key, respectively, and the KDF field of the MKT for that TCP session with a value indicating a KDF direct function is to be used, wherein the KDF direct function causes the send key populated in the send key field of the MKT to be set as a send_SYN_traffic key and send_other_traffic_key and the receive key populated in the receive key field of the MKT to be set as a receive_SYN_traffic_key and receive_other_traffic_key, instead of negotiating a shared master key and using a KDF to derive the send_SYN_traffic_key, send_other_traffic_key, receive_SYN_traffic_key, and receive_other_traffic_key from the master key; and
      the TCP-AO module further operative to protect each of the set of TCP sessions using the send_SYN_traffic_key, send_other_traffic_key, receive_SYN_traffic_key, and receive_other_traffic_key of the MKT for that TCP session, whereby the TCP sessions are protected by the TCP-AO module by directly using the negotiated traffic keys, instead of using traffic keys derived from a negotiated master key.

8. The network element of claim 7, wherein the TCP-AO module is further operative to trigger the KMP module to negotiate, for each TCP session, the plurality of traffic keys for that TCP session.

9. The network element of claim 8, wherein the TCP-AO module is further operative to trigger the KMP module to negotiate the traffic keys by transmitting one or more of the following to the KMP module:
- an IP address of the peer network element;
- an indication that an extra Diffie-Hellman key exchange is to be performed when negotiating the traffic keys;
- an indication of a set of one or more Message Authentication Code (MAC) algorithms supported on the network element that can be used when authenticating outgoing and incoming TCP segments of that TCP session;
- a lifetime of the plurality of traffic keys for that TCP session; and
- a set of one or more identifiers for that TCP session.

10. The network element of claim 7, wherein the KMP module is further operative to, for each of the set of TCP sessions, negotiate an indication of a Message Authentication Code (MAC) algorithm used by the TCP-AO module when authenticating outgoing and incoming TCP segments of that TCP session.

11. The network element of claim 7, wherein the KMP module is further operative to, for each of the set of TCP sessions, negotiate a lifetime of the plurality of traffic keys for that TCP session.

12. The network element of claim 7, wherein for each of the set of TCP sessions, the negotiated traffic keys are unique.

13. The network element of claim 7, wherein the application is a TCP application.

14. A network element for supporting Transmission Control Protocol Authentication Option (TCP-AO) with a Key Management Protocol (KMP) to authenticate TCP segments over TCP sessions, comprising:
- a set of one or more processors; and
- a non-transitory computer-readable medium that stores instructions that, when executed by the set of processors, cause the set of processors to perform operations including:
  - in response to a request to create a first TCP session with a peer network element, determining whether a first Master Key Tuple (MKT) associated with the first TCP session has been previously created,
  - in response to determining the first MKT has not been previously created, creating the first MKT that includes a send key field, a receive key field, and a Key Derivation Function (KDF) field,
  - negotiating, over a first secure encrypted channel, a first plurality of traffic keys including a send key used for authenticating outgoing TCP segments transmitted to the peer network element over the first TCP session and a receive key for authenticating incoming TCP segments received from the peer network element over the first TCP session,
  - populating the send key field and the receive key field of the first MKT with the negotiated send key and receive key, respectively, and the KDF field of the first MKT with a value indicating a KDF direct function is to be used, wherein the KDF direct function causes the send key populated in the send key field of the first MKT to be set as a send_SYN_traffic key and send_other_traffic_key and the receive key populated in the receive key field of the first MKT to be set as a receive_SYN_traffic_key and receive_other_traffic_key, instead of negotiating a shared master key and using a KDF to derive the send_SYN_traffic_key, send_other_traffic_key, receive_SYN_traffic_key, and receive_other_traffic_key from the master key; and
  - protecting the first TCP session with the TCP-AO by using the send_SYN_traffic_key, send_other_traffic_key, receive_SYN_traffic_key, and receive_other_traffic_key, whereby the first TCP session is protected by the TCP-AO by directly using the negotiated traffic keys, instead of using traffic keys derived from a negotiated master key.

15. The network element of claim 14, wherein the non-transitory computer-readable medium further stores instructions that, when executed by the set of processors, cause the set of processors to perform operations including:
- negotiate a lifetime of the first negotiated traffic keys.

16. The network element of claim 15, wherein the non-transitory computer-readable medium further stores instructions that, when executed by the set of processors, cause the set of processors to perform operations including:
- negotiate, over a second secure encrypted channel, a second plurality of traffic keys to authenticate TCP segments over a second TCP session with the peer network element; and
- negotiate a lifetime of the second negotiated traffic keys, wherein the lifetime of the first negotiated traffic keys is different than the lifetime of the second negotiated traffic keys.

17. The network element of claim 14, wherein the non-transitory computer-readable medium further stores instructions that, when executed by the set of processors, cause the set of processors to perform operations including:
- negotiating an indication of a first Message Authentication Code (MAC) algorithm to use when protecting the first TCP session.

18. The network element of claim 17, wherein the non-transitory computer-readable medium further stores instructions that, when executed by the set of processors, cause the set of processors to perform operations including:
- negotiating, over a second secure encrypted channel, a second plurality of traffic keys to authenticate TCP segments over a second TCP session with the peer network element;
- negotiating an indication of a second MAC algorithm to use when protecting the second TCP session, wherein the first MAC algorithm and second MAC algorithm are different; and
- protecting the second TCP session with the negotiated second plurality of traffic keys.

19. The network element of claim 18, wherein the first negotiated traffic keys are unique to the first TCP session and the second negotiated traffic keys are unique to the second TCP session.

* * * * *